(No Model.) 2 Sheets—Sheet 2.
J. L. SLATTON.
COMBINED HARVESTER AND SEPARATOR.
No. 586,782. Patented July 20, 1897.
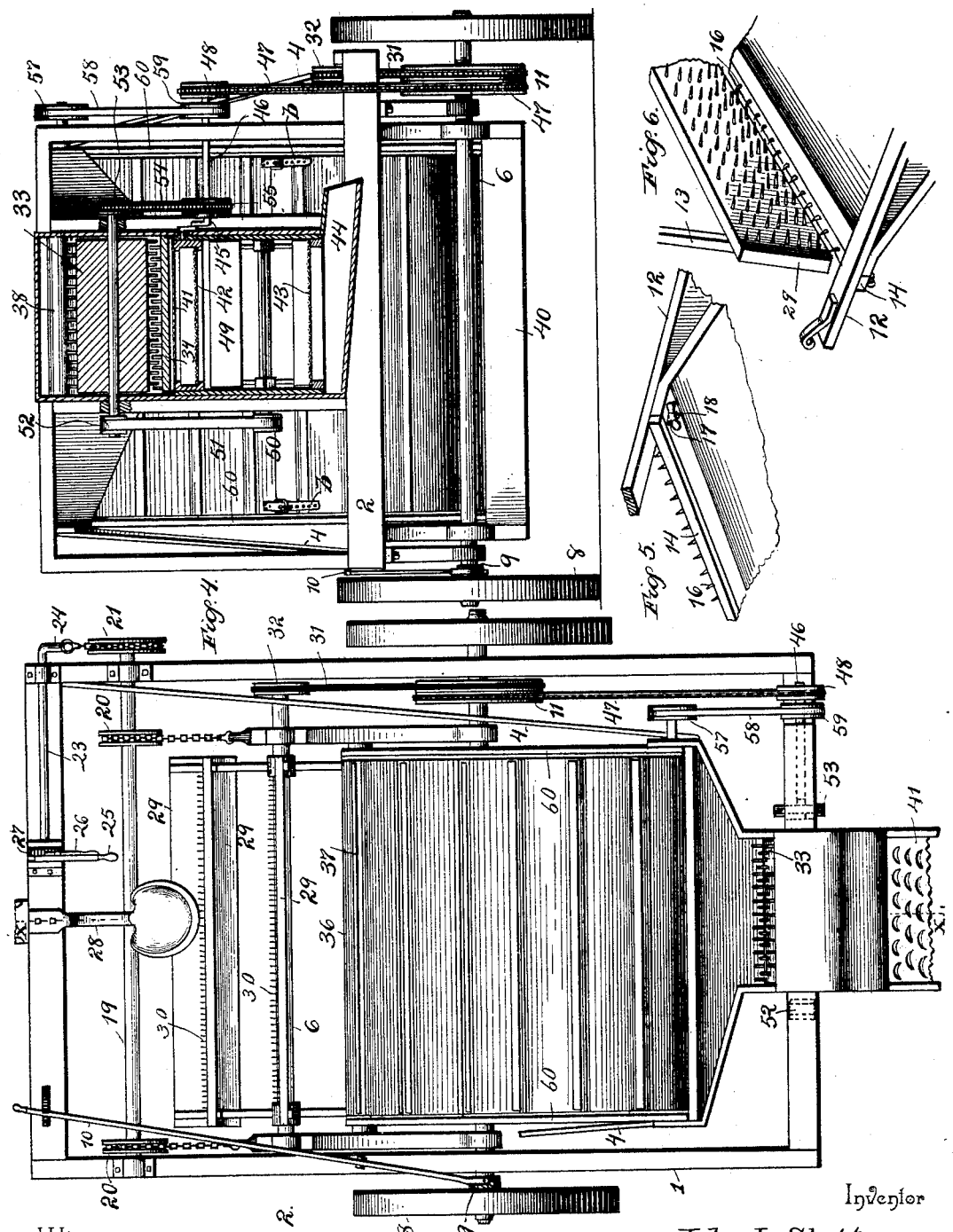
Witnesses
Victor J. Evans.
V. B. Hillyard.
Inventor
John L. Slatton.
By his Attorneys,
C. A. Snow & Co.

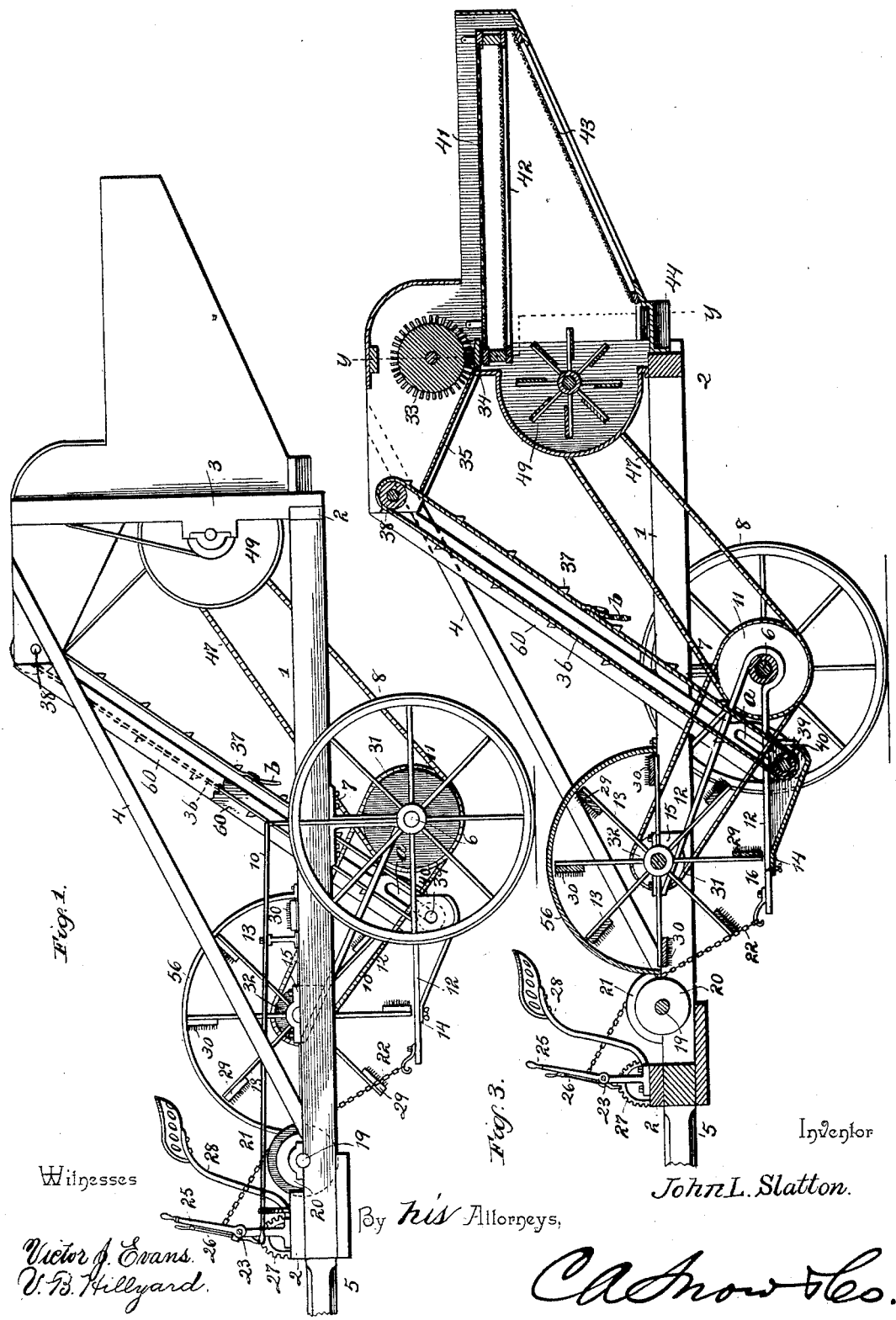

UNITED STATES PATENT OFFICE.

JOHN LOSSON SLATTON, OF NEWARK, TENNESSEE, ASSIGNOR OF ONE-HALF TO JESSE D. GOFF, OF SPARTA, TENNESSEE.

COMBINED HARVESTER AND SEPARATOR.

SPECIFICATION forming part of Letters Patent No. 586,782, dated July 20, 1897.

Application filed March 24, 1896. Serial No. 584,692. (No model.)

*To all whom it may concern:*

Be it known that I, JOHN LOSSON SLATTON, a citizen of the United States, residing at Newark, in the county of White and State of Tennessee, have invented a new and useful Combined Harvester and Separator for Peas, Beans, &c., of which the following is a specification.

This invention aims to provide a machine for harvesting, threshing, and separating peas, beans, buckwheat, &c., and which will perform the several operations thoroughly and effectively and which can be drawn over the field by a single horse or team and will be light-running, compared with the nature and character of work to be performed.

One of the main objects is to have the operating parts adjustable, so that the machine can be adapted to the bulk of the harvest and to the character thereof, and to have the machine at all times under the control of the driver, so that it can be thrown into or out of gear at a moment's notice to avoid injury to the operating parts under abnormal conditions.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a machine for attaining the objects of this invention. Fig. 2 is a top plan view thereof, parts being broken away and the housing of the reel omitted. Fig. 3 is a vertical longitudinal section about on the line X X of Fig. 2. Fig. 4 is a detail section on the line Y Y of Fig. 3. Fig. 5 is a detail view showing the instrumentalities for adjusting the resistance bar or plate. Fig. 6 is a detail view of a portion of the harvesting or stripping mechanism on a larger scale.

Corresponding parts are referred to in the following description and indicated in the several views of the accompanying drawings by the same reference-characters.

The frame of the machine, which may be of suitable construction to support the operating parts, comprises longitudinal beams 1, cross-beams 2, uprights 3, and braces 4, connecting the upper ends of the uprights 3 with the longitudinal beams 1 near the front ends of the latter.

The pole or tongue 5 is applied to the frame to admit of the team drawing the machine over the field without trampling down the vines or grain. An axle 6 is journaled in hangers 7, pendent from the frame, and is provided with ground-wheels 8, one of the latter forming the driver and adapted to be clutched to the axle when required, so that the operating parts may receive motion when the machine is performing service.

A half-clutch 9 is mounted upon the end portion of the axle adjacent to the drive-wheel in such a manner as to turn with the axle, but free to have a movement to and from the drive-wheel, so as to engage with a matching clutch on the hub of the drive-wheel when it is desired to impart motion to the actuating mechanisms when the machine is traveling. A lever 10 is suitably fulcrumed upon the frame, and its rear end is operatively connected with the half-clutch 9, and its front end is within convenient reach of the driver, so as to be operated to throw the machine in or out of gear by moving the half-clutch 9 toward the companion clutch on the drive-wheel or away from the drive-wheel, as will be readily understood. A twin sprocket gear-wheel 11 is placed upon the axle 6, and motion is transmitted therefrom to the harvesting and separating mechanisms by sprocket chains and gearing in a manner which hereinafter will be more fully explained.

Two side pieces or frames 12 are mounted at one end upon the axle 6, and their opposite or front ends receive and support the stripping or harvesting mechanism, the latter consisting of a reel 13 and a resistance bar or plate 14, the latter being located below the active ends of the reel members and acting in opposition to the latter to strip the pods and grain from the vines and stalks.

The side pieces 12 are of triangular shape and are constructed from bar iron or steel and are placed with their angles toward the rear end of the machine and so as to receive the axle in or at the angles and with their wider ends facing the front end of the machine. Bearings 15 are applied to the upper front ends of the frames 12 and receive the journals of the reel 13, and the resistance bar or plate 14 has connection with the front portion of the lower members of the said frames 12. This resistance bar or plate 14 is preferably of wood, and its front edge is reinforced by a strip of hard and tough wood or a bar of metal to resist the wear attendant upon the stripping of the pods and grain from the vines and stalks. Spurs 16 are provided at the front edge of the part 14 and tend to facilitate the operation of harvesting or stripping, and these spurs may be located any required distance apart and be of any desired length as found best adapted for the purpose, and in some instances they may be dispensed with altogether.

The front edge of the part 14 is located forward of a plane passing perpendicularly through the axis of the reel 13, and a slight space exists between the active elements of the reel and the said front edge of the part 14, and this space can be varied according to the character of the harvest, and to attain this result the part 14 is adjustably connected with the lower members of the frames 12 and is formed near its edges with a series of openings 17 to receive the bolts 18, by means of which the connection is effected.

In order to adapt the harvesting mechanism to the height of the vines or grain, means are provided to adjust the same vertically, and, as shown, the same consist of a shaft 19, having grooved wheels 20 near its ends and a grooved wheel 21 at one end, chains or cords 22 connecting the grooved wheels 20 with the front ends of the lower members of the side frames 12, a second shaft 23 having a radius-bar 24 at its outer end which is connected with the grooved wheel 21 and a lever 25 at the inner end of the shaft 23 and provided with the usual hand-latch 26 to take into a notched segment 27, whereby the lever 25 and the parts connected therewith are held in the located position. The lever 25 is readily accessible from the driver's seat 28 and when operated serves to raise and lower the harvesting mechanism through the connections just described.

The reel 13 comprises a shaft and radial arms, the arms at one side of the machine being in transverse alinement with the corresponding arms at the opposite side of the machine, and the transversely-alining arms are connected by slats 29, secured thereto, and these slats, of desired width, may be smooth on their active faces or may have teeth 30 projecting therefrom to engage positively with the pods and grain and tear the same from their vines and stalks. A sprocket-chain 31 connects one of the twin sprocket-gears 11 with a sprocket-pinion 32 on a journal or the shaft of the reel 13, thereby driving the latter directly from the axle.

A thresher is located at the rear end of the machine and comprises a toothed cylinder 33 and a breast 34, having teeth on its upper side to act in opposition to the teeth of the cylinder to effect the threshing. These parts 33 and 34 are suitably housed, the bottom 35 of the housing being rearwardly and downwardly inclined and terminating opposite the space between the cylinder and breast, so as to direct the pods and grain to the threshing mechanism. The housing may be properly designated as a "hopper" which receives the peas, beans, &c., to be threshed, an elevator 36 being employed to transfer the harvest from the stripping mechanism to the threshing provisions. This elevator is of ordinary construction, comprising a belt, of either canvas or leather, provided at intervals with slats or buckets 37 to engage with and lift the peas, beans, &c., as will be readily comprehended. The roller 38 for supporting the upper end of the elevator is journaled at the front end of the hopper or housing of the threshing mechanism, and the roller 39 for supporting the lower portion of the elevator is journaled in bearings attached to the lower members of the side frames 12. Thus it will be seen that the lower end of the elevator maintains a fixed relation to the side frames 12 and moves therewith.

To allow for the adjusting of the harvesting mechanism, the elevator is adapted to be lengthened and shortened, this result being effected by having the elevator separated transversely and having the separated ends overlapping and adapted to be secured together by straps $b$ or lacing in the usual way. The resistance bar or plate 14 inclines rearwardly and downwardly, so as to direct the pods or grain to the receiving end of the elevator, and in order to prevent the escape of the peas a strip 40, of leather or other suitable material, is interposed between the lower end of the elevator and the part 14, so as to extend across and close the gap between these elements.

A separator is disposed below and in the rear of the threshing mechanism and comprises approximately horizontal screens 41 and 42 and an inclined screen 43, the latter being placed below the screens 41 and 42 and inclining forwardly and downwardly from its rear end and terminating in the rear of a transversely-disposed spout 44, by means of which the shelled peas, beans, &c., are delivered at one side of the machine into a suitable receptacle placed to receive them.

The screens 41 and 42 are connected and pendently supported and in effect constitute a shoe and receive a reciprocating motion, the latter being imparted thereto by means of a crank 45, provided on a shaft 46, the latter receiving its motion from one of the twin gears 11 by means of a sprocket-chain 47. This sprocket-chain 47 passes around a sprocket-gear 48 on the shaft 46. The screen 41 is of sheet metal, preferably galvanized iron, having approximately semicircular openings through which the peas, beans, &c., and the small particles of the hulls pass, and the screen 42 has openings of smaller size to separate the larger pieces of hulls, the openings being of such size as to admit of the largest-sized peas, beans, &c., passing therethrough. The screen 43 is of fine wire interlaced to provide meshes for the escape of broken peas, &c. The screen 41 is slightly elevated at its rear end and the screen 42 correspondingly depressed, as this disposition of the parts has been found to give the best results. A fan 49 is located opposite the space formed between the front ends of the screens 42 and 43, and its shaft or journal is extended at one end and supplied with a pulley 50 to receive a drive-belt 51, which passes around a corresponding pulley 52 on the shaft or extended journal of the threshing-cylinder 33, whereby motion is imparted to the fan from the threshing-cylinder. A sprocket-pinion 53 is secured upon the opposite end of the shaft or extended journal of the threshing-cylinder and a sprocket-chain 54 connects it with a sprocket gear-wheel 55 on the shaft 46, thereby serving to impart motion to the threshing-cylinder from the said shaft 46.

The operation of the machine may be briefly stated as follows: The harvesting or stripping mechanism being adjusted to suit the height of the product to be harvested, the machine is drawn over the field so that the vines or grain will engage with the front edge of the resistance bar or plate 14 and the reel 13 rotating will cause its slats 29 to engage with the product and strip the same from the vines or stalks, and the pods or heads of grain falling upon the part 14 will gravitate to the lower rear end thereof and be taken up by the elevator and carried to the threshing mechanism, which after performing its part of the operation will discharge the threshed product onto the topmost separating-screen, which latter, in conjunction with the fan 49, will separate and clean the product in the manner previously described, and the product being received into the spout 44 will be conveyed to a receptacle for its reception.

It will be understood that a sufficient space must exist between the part 14 and the active edges of the slats 29 to prevent injury to the product being harvested, and in order to guard against the reel carrying the product forward its upper portion is protected by a housing 56.

The elevator is operated from the shaft 46 by means of a belt 58, passing over a pulley 59 on the said shaft 46 and around a pulley 57 on an extended journal or shaft of the roller 38.

To prevent the peas from falling off the sides of the elevator, side pieces 60, of sheet metal or wood, are provided and attached so as not to interfere with the vertical adjustments of the frames 12.

The side pieces 60 are loosely mounted at their upper ends upon the journals of the roller 38 and their lower ends have longitudinal slots $a$ to receive the journals of the roller 39, whereby provision is had for the adjustment of the side frames 12 when it is required to raise or lower the harvesting or stripping mechanism.

Having thus described the invention, what is claimed as new is—

1. In a machine for harvesting peas, beans, &c., the combination of a relatively-fixed frame, a frame carrying the harvesting devices vertically adjustable with relation to the fixed frame, an elevator having its upper roller supported by the fixed frame and its lower roller by the adjustable frame, and means for varying the length of the elevator to adapt it to the distance between its supporting-rollers, substantially as set forth.

2. In a machine for harvesting peas, beans, &c., the combination of a relatively-fixed frame, a second frame having independent vertical adjustment and comprising similarly-formed side pieces, a resistance bar or plate connecting the lower front ends of the side pieces and having a rearwardly and downwardly inclined portion forming a pocket at its rear end, a reel journaled to the upper front ends of the side pieces and coöperating with the resistance-bar to strip the peas, &c., from the vines and force them into the said pocket, a roller applied to the fixed frame, a second roller carried by and movable with the adjustable frame, and a carrier-belt capable of being lengthened and shortened supported by the said rollers, substantially as shown for the purpose described.

3. In a harvesting-machine, the combination of a relatively-fixed frame, an axle provided with ground-wheels supporting the frame, a second frame comprising side pieces formed of bars bent into an approximately triangular shape and loosely mounted at their rear ends or angles upon the said axle, means for vertically adjusting the front end of the second frame, a resistance-bar having adjustable connection with the forward portions of the lower members of the side pieces, and having a rear extension terminating in a pocket, a reel coöperating with the resistance-bar and journaled to the front ends of the upper members of the said side pieces, and an elevator capable of being lengthened and shortened supported on a roller carried by the fixed frame and by a roller carried by and movable with the adjustable frame, substantially as and for the purpose set forth.

4. A machine for harvesting peas, beans, &c., comprising a frame, an elevated thresher and separator in connected relation, side pieces pivotally supported at their rear ends upon the axle, a reel and resistance-bar supported at the front end of the said side pieces, means for adjusting the pivoted side pieces at their front ends, an elevator journaled at its lower end to the adjustable side pieces and at its upper end to the thresher, and means for lengthening and shortening the elevator to adapt it to the varying distance between its upper and lower supporting-rollers, substantially as set forth.

In testimony that I claim the foregoing as my own I have hereto affixed my signature in the presence of two witnesses.

JOHN LOSSON SLATTON.

Witnesses:
J. W. AUSTIN,
J. D. GOFF.